(12) United States Patent  
Gavigan et al.

(10) Patent No.: US 8,168,065 B1  
(45) Date of Patent: May 1, 2012

(54) SWIMMING POOL SKIMMER BASKET AND CHLORINATOR

(76) Inventors: Michael K. Gavigan, Middleboro, MA (US); William J. Gladue, Middleboro, MA (US)

( * ) Notice: Subject to any disclaimer, the term of this patent is extended or adjusted under 35 U.S.C. 154(b) by 207 days.

(21) Appl. No.: 12/767,124

(22) Filed: Apr. 26, 2010

(51) Int. Cl.
    *E04H 4/12* (2006.01)
    *C02F 1/76* (2006.01)

(52) U.S. Cl. .................... 210/167.11; 210/238

(58) Field of Classification Search ............ 210/167.11, 210/206, 232, 238
See application file for complete search history.

(56) References Cited

U.S. PATENT DOCUMENTS

| | | | |
|---|---|---|---|
| 3,469,700 A | 9/1969 | Johnson | |
| 5,053,205 A * | 10/1991 | Taylor et al. | 422/265 |
| 5,124,032 A | 6/1992 | Newhard | |
| 5,234,588 A * | 8/1993 | Aymes | 210/202 |
| D377,249 S | 1/1997 | Granshaw | |
| 5,662,795 A * | 9/1997 | Pickens et al. | 210/167.11 |
| 5,830,350 A | 11/1998 | Voss et al. | |
| 5,888,386 A | 3/1999 | Enright et al. | |
| 6,180,017 B1 | 1/2001 | Usher | |
| 6,471,856 B1 * | 10/2002 | Keith | 210/167.12 |
| 6,511,605 B2 * | 1/2003 | Connelly, Jr. | 210/749 |
| 6,592,756 B1 | 7/2003 | Felix et al. | |
| 6,790,353 B2 * | 9/2004 | Connelly, Jr. | 210/198.1 |
| 7,419,590 B2 * | 9/2008 | King et al. | 210/167.11 |
| 2004/0045895 A1 * | 3/2004 | Bonelli et al. | 210/497.1 |

* cited by examiner

*Primary Examiner* — Fred Prince, Jr.
(74) *Attorney, Agent, or Firm* — Altman & Martin; Steven K Martin

(57) ABSTRACT

A swimming pool skimmer basket and chlorinator includes a basket and a removable divider that partitions the basket into a chlorine tablet compartment below and a debris compartment above. The basket is cylindrical with a flat base and has a plurality of apertures for passing water. The divider is a round disk with a plurality of apertures for passing water from the debris compartment to the tablet compartment. The disk has a handle with a vertical post and a cross bar. A latch retains the divider in the basket so the handle can pull the basket from the skimmer well. The latch includes protrusions from the ends of the cross bar that fit into corresponding depressions in the basket wall.

4 Claims, 5 Drawing Sheets

SWIMMING POOL SKIMMER BASKET AND CHLORINATOR

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to swimming pools, more particularly, to a pool skimmer/chlorinator that simplifies cleaning.

2. Description of the Related Art

Most swimming pools have a skimmer that filters large debris, such as leaves and insects, from the water. The water enters a skimmer well through an aperture and weir in the pool wall at the water line. A porous skimmer basket sits in the well to trap the debris. The pool water passes through the basket into the pipe that carries the water to the filter. Because the basket fills up with debris over time, it is generally removable for emptying and cleaning.

Chlorine tablets or sticks are used to maintain the pool water chemistry, which is required to keep the pool clean and safe. Some pool owners put the chlorine tablets or sticks into the skimmer basket so that they are dissolved by the water flowing over them.

When the basket needs to be emptied, it is pulled from the well. The debris can be pulled out of the basket by hand. However, because the debris can be hazardous—it may have insects and other dead animals that fell into the pool—many people prefer to dump the debris out without touching it. Unfortunately, the chlorine tablets—which can be expensive—get dumped out with the debris and are lost unless they are pulled from the potentially hazardous debris by hand.

One solution to this problem is found in U.S. Pat. No. 5,888,386, issued to Enright et al. The chlorine tablets sit in a shallow basket below the debris basket. The debris is trapped in the debris basket and never reaches the chlorine tablets. The debris basket can be removed and dumped out without losing the chlorine tablets. One shortcoming is that either a clip between the two baskets or reaching into the well is necessary in order to remove the shallow basket from the well.

BRIEF SUMMARY OF THE INVENTION

An object of the present invention is to provide a swimming pool skimmer basket that is easy to clean without losing the chlorine tablets.

Another object is to provide a swimming pool skimmer basket that isolates the chlorine tablets from the debris and are easy to remove or replace.

The swimming pool skimmer basket and chlorinator of the present invention includes a basket and a removable divider that partitions the basket into a debris compartment that retains debris skimmed from the swimming pool water and a tablet compartment that stores one or more chlorine tablets.

The basket has the same structural dimensions as a conventional skimmer basket. The basket is typically cylindrical with a flat base and has a plurality of apertures for passing the water.

The divider is a round disk with a plurality of apertures for passing the swimming pool water from the debris compartment to the tablet compartment. The disk slides into the basket with a minimal gap between the basket wall and the disk so that large debris does not pass into the tablet compartment.

The disk has a handle. The preferred handle is a vertical post and a cross bar although the handle can be any shape that can be grasped to lift the skimmer basket and chlorinator 10 from the skimmer well.

Optionally, a guide that keeps the divider from rotating in the basket. A preferred guide includes one or more vertical rails in the basket and corresponding notches in the disk.

A latch retains the divider in the basket so the handle can pull the basket from the skimmer well. A number of different latch mechanisms are contemplated. All of the contemplated latching mechanisms have protrusion from the ends of the handle cross bar. The protrusions fit into corresponding depressions in the basket wall. Optionally, the protrusions can be spring operated such that they can be retracted into the cross bar.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The swimming pool skimmer basket and chlorinator 10 of the present invention provides a clean and simple solution to the problem of losing chlorine tablets 8 when cleaning out the skimmer basket. In the present specification, references to chlorine tablets 8 include any solid-form swimming pool chemicals, such as chlorine tablets, chlorine sticks, and bromide tablets.

Figure 1:
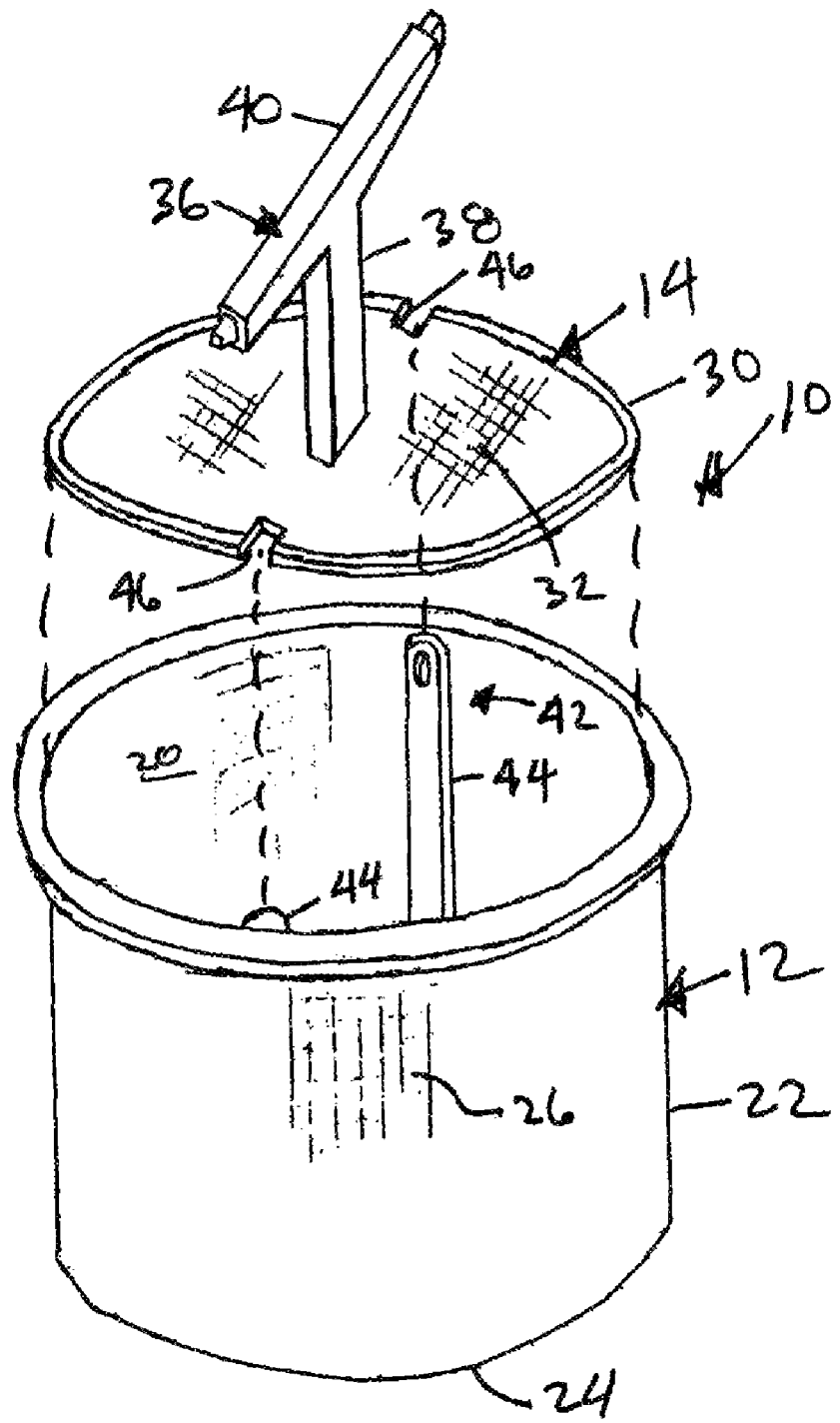
FIG. 1 is a perspective view of the swimming pool skimmer basket and chlorinator of the present invention.
Figure 2:
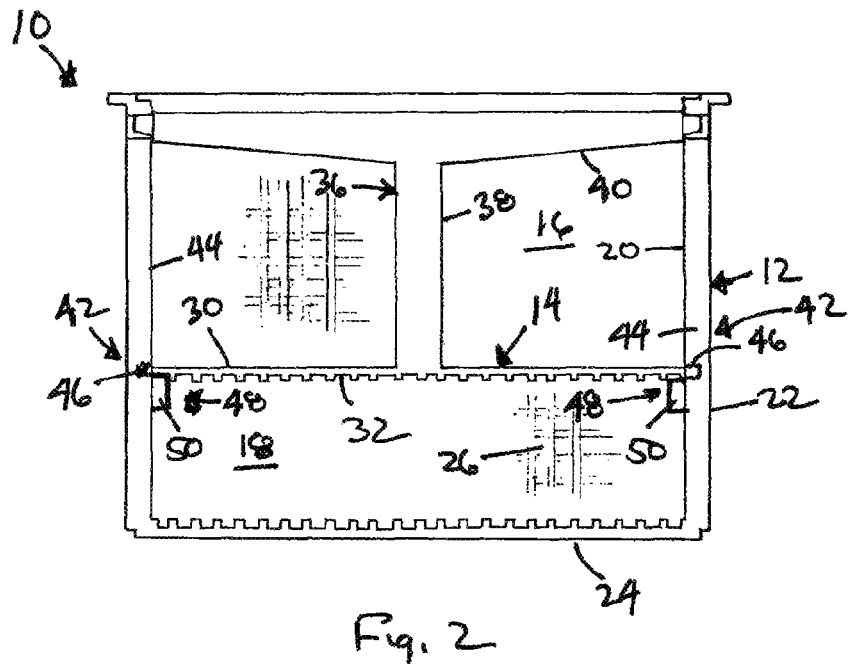
FIG. 2 is a cross-sectional view of the pool skimmer basket and chlorinator of FIG. 1.

As shown in FIGS. 1 and 2, the swimming pool skimmer basket and chlorinator 10 of the present invention includes a basket 12 and a removable divider 14 that partitions the basket 12 into a debris compartment 16 and a tablet compartment 18. The debris compartment 16 is designed to receive and retain debris 6 skimmed from the swimming pool water. The tablet compartment 18 is designed to receive and store one or more chlorine tablets 8.

The basket 12 preferably has the same structural dimensions as a conventional skimmer basket used in conventional swimming pool skimmer systems. The basket 12 can be composed of a variety of materials such as plastics, such as nylon, polyvinlychloride, and copolymer polypropylene, carbon composites, and metals, such as stainless steel, and combinations thereof. The basket 12 includes a frustro-conical or cylindrical side wall 22 and a flat base 24, both with a plurality of apertures 26 for passing the swimming pool water.

The divider 14 includes a round disk 30 of a material the same as or similar to the basket 12 material. The disk 30 has a plurality of apertures 32 for passing the swimming pool water from the debris compartment 16 to the tablet compartment 18. The disk diameter is such that the divider slides into the basket 12 leaving a minimal gap between the basket wall 22 and the disk 30 so that the large debris 6 trapped in the basket 12 does not pass into the tablet compartment 18.

Extending vertically from the center of the disk 30 is a post 38 with a cross bar 40 at the upper end forming a handle 36 that facilitates removing the divider 14 from the basket 12. The handle 36 can be formed with the disk 30 or can be formed separately from the disk 30 and attached later during an assembly process. The post 38 and cross bar 40 can be formed as single unit or can be formed separately and attached later during the assembly process. Although shown as T-shaped, the handle 36 can be any shape that can be grasped to lift the skimmer basket and chlorinator 10 from the well 4.

If the handle 36 is formed separately from the disk 30 and/or the cross bar 40 is formed separately from the post 38, any appropriate method can be used to attach the handle 36 to the disk 30 and/or cross bar 40 to the post 38. A non-exhaustive list of such methods include adhesives, screws, snaps, and barbs.

The height of the handle 36 may be dictated by the optional latch 52 described below. Otherwise, handle 36 does not extend much above the basket 12 when the chlorine tablets 8 are in the basket 12 and the divider 14 is installed. This height limitation prevents the handle 36 from interfering with closing the pool skimmer cover 2.

Figure 3:
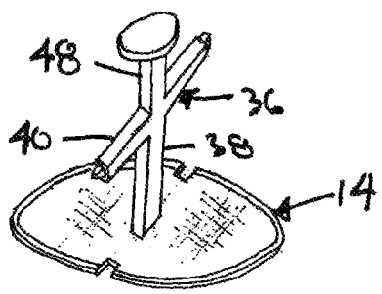
FIG. 3 is a perspective view of another configuration of the divider of FIG. 1.

Optionally, the handle 36 has an extension 48, as in FIG. 3. The extension 48 extends higher than the water line so that the skimmer basket and chlorinator 10 can be removed from the well 4 without the user getting wet. The extension 48 cannot extend higher than the top of the well 4, otherwise it would interfere with closing the pool skimmer cover 2. The extension 48 can be a disk, as in FIG. 3, or other shape, such as a T, with a post and cross bar, that can be grasped to lift the skimmer basket and chlorinator 10 from the well 4.

Optionally, the basket 12 and divider 14 include a guide 42 that keeps the divider 14 from rotating in the basket 12. A preferred guide 42, shown in FIGS. 1 and 2, includes one or more vertical rails 44 in the inner wall 20 of the basket 12 and a corresponding notch 46 in the disk 30. There is no particular requirement for the cross-sectional shape of the rails 44 and notches 46.

Optionally, there is a stop 48 to keep the divider 14 from going too far into the basket 12. The stop 48 can be a section 50 of the rail 44 that is larger than the notch 46 so that the notch 46 cannot pass, as in FIG. 2.

A latch 52 retains the divider 14 in the basket 12 so that the handle 36 can be used to pull the basket 12 from the skimmer well 4. A number of different latch mechanisms are contemplated by the present invention.

Figure 4:
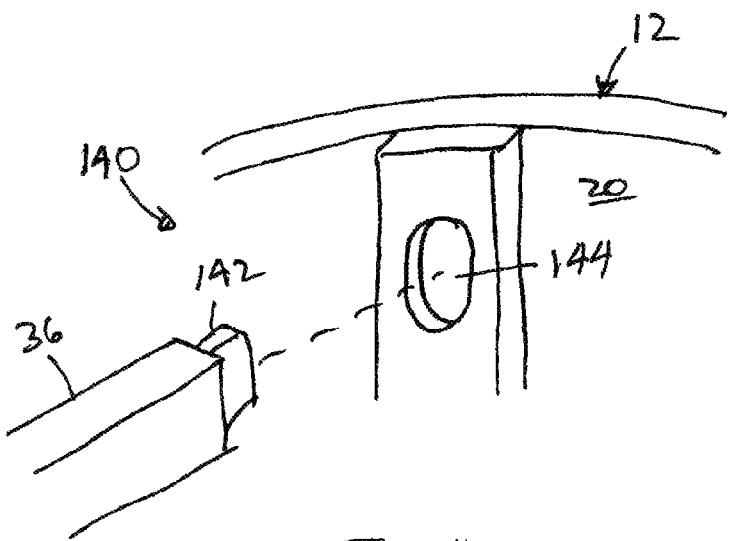
FIG. 4 is a detail view of a first latching mechanism.

The first latching mechanism 140, shown in FIG. 4, includes a pair of protrusions 142 from the ends of the handle 36 and corresponding depressions 144 on the basket inner wall 20. To install the divider 14, the opposite sides of the basket 12 midway between the two depressions 144 are squeezed together, thereby increasing the distance between the depressions 144. One protrusion 142 is inserted into a depression 144 and the second protrusion 142 is aligned with the second depression 144. When pressure is released from the sides of the basket 12 to allow the basket 12 to return to its normal shape, the second protrusion 142 slides into the second depression 144.

Figure 5:
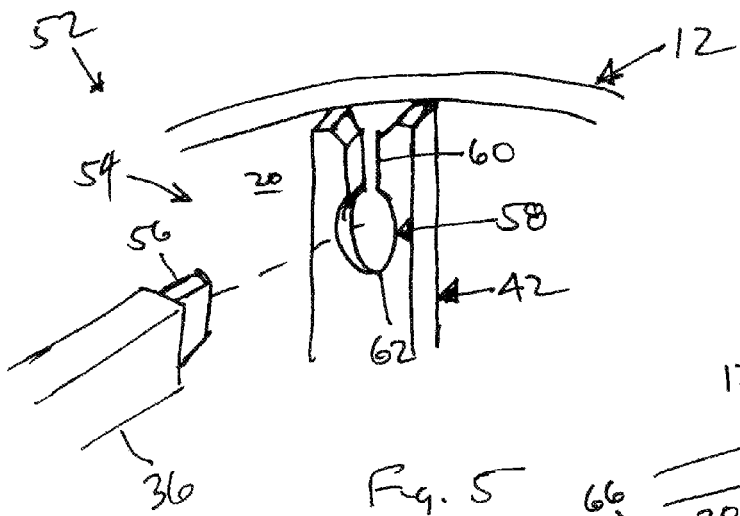
FIG. 5 is a detail view of a second latching mechanism.

Another latching mechanism 54, shown in FIG. 5, includes a pair of protrusions 56 at the ends of the handle 36 and corresponding vertical slots 58 in the basket inner wall 20. Each slot 58 has an upper neck 60 that is narrower than a lower portion 62. As the divider 14 is installed in the basket 12, the protrusion 56 is aligned with the slot 58. If the guide 42 is used, alignment is automatic. As the protrusion 56 touches the top of the neck 60 of the slot 58, the handle 36 is pushed downwardly, causing the protrusion 56 to distend the neck 60, thereby sliding through the neck 60 and snapping into the lower portion 62. For this latching mechanism to operate properly, the material of the basket 12 must be slightly flexible so that the neck 60 can distend. The protrusion 56 is removed from the notch 58 by reversing the installation procedure.

Figure 6:
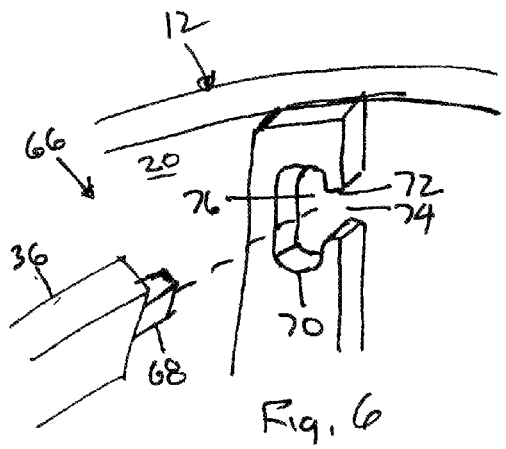
FIG. 6 is a detail view of a third latching mechanism.

Another latching mechanism 66, shown in FIG. 6, includes a pair of protrusions 68 at the ends of the handle 36 and corresponding horizontal notches 70 in the basket inner wall 20. Each notch 70 has a neck 72 at the opening 74 that is narrower than the inner portion 76. As the divider 14 is installed in the basket 12, the protrusion 68 reaches the level of the notch opening 74. The handle 36 is twisted into the notch 70, causing the protrusion 68 to distend the neck 72, thereby sliding through the neck 72 and snapping into the inner portion 76. For this latching mechanism to operate properly, the material of the basket 12 must be slightly flexible so that the neck 72 can distend.

Figure 7:
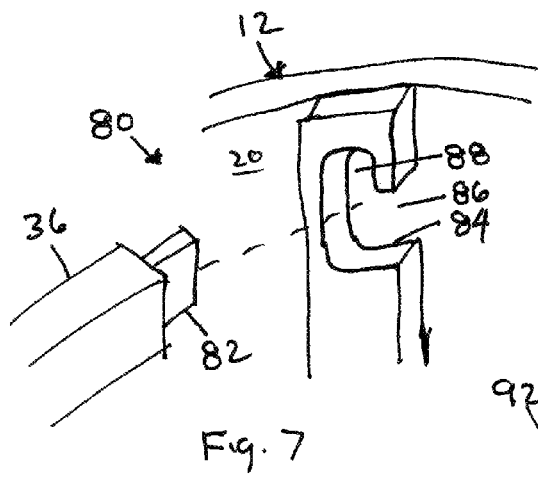
FIG. 7 is a detail view of a fourth latching mechanism.

Another latching mechanism 80, shown in FIG. 7, includes a pair of protrusions 82 at the ends of the handle 36 and corresponding horizontal notches 84 in the basket inner wall 20. The notch 84 has an L shape with an opening 86. As the divider 14 is installed in the basket 12, the protrusion 82 reaches the level of the notch opening 86. The handle 36 is rotated until the protrusion 82 is in the notch 84. When the handle 36 is pulled upwardly to remove the basket 12 from the well, the protrusion 82 fits into an indentation 88 so that the protrusion 82 does not come out of the notch 84 while the basket 12 is being removed.

Figure 8:
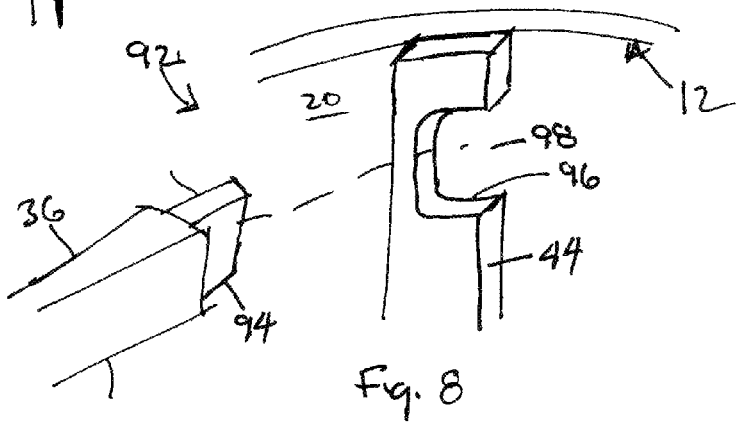
FIG. 8 is a detail view of a fifth latching mechanism.

Another latching mechanism 92, shown in FIG. 8, is intended for use with guide rails 44 and guide notches 46. There are a pair of protrusions 94 at the ends of the handle 36 and corresponding horizontal notches 96 in the side of the rail 44. The notch 96 is generally rectangular with an opening 98. As the divider 14 is installed in the basket 12 and the protrusion 94 reaches the top of the basket 12, the handle 36 is twisted away from alignment with the rail 44. Because the guide 42 keeps the disk 30 from rotating in the basket 12, the handle post 38 acts as a torsion spring. As the divider 14 continues into the basket, the protrusion 94 reaches the level of the opening 98. The twisting pressure on the handle 36 is released so that the post 38 returns the handle 36 to its normal position, causing the protrusion 94 to enter the notch opening 98. Torsion from the post retains the protrusion 94 in the notch 96.

Figure 9:
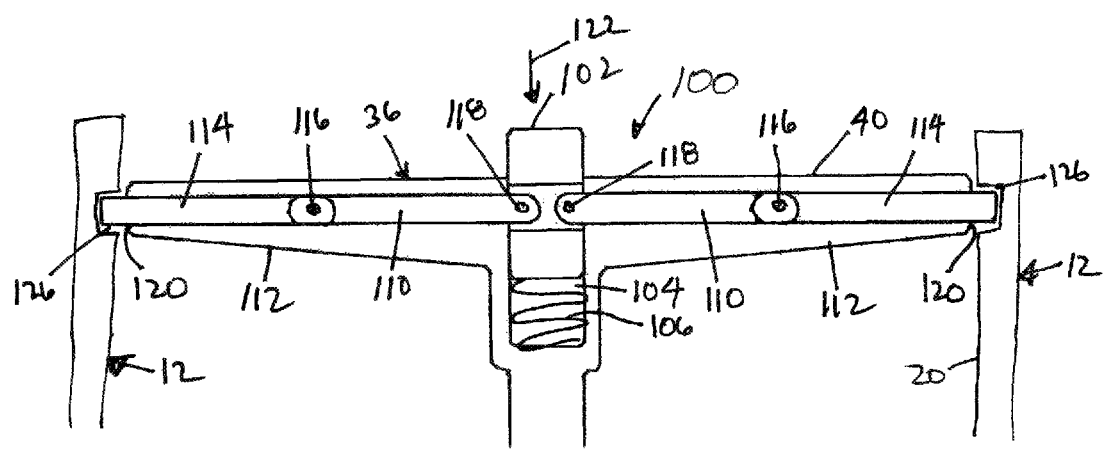
FIG. 9 is a cross-sectional view of a spring loaded latching mechanism in the engaged position.
Figure 10:
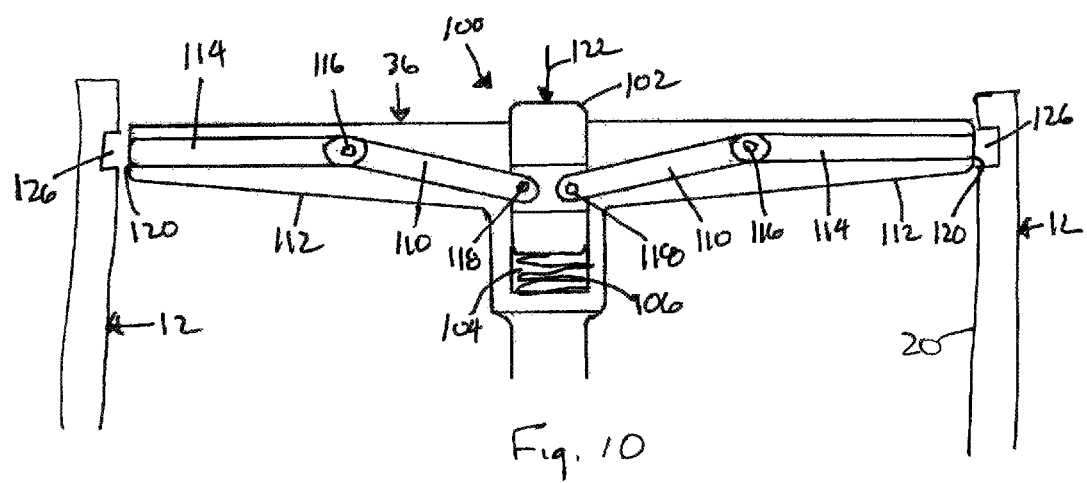
FIG. 10 is a cross-sectional view of the spring-loaded latching mechanism of FIG. 9 in the disengaged position.

The present invention also contemplates that the latching mechanism 100 can be spring-loaded, an example of which is shown in FIGS. 9 and 10. A pushbutton 102 reciprocates within an opening 104 in the handle 36. A spring 106 biases the pushbutton 102 upwardly, as in FIG. 9. A pair of linkages 110 are pivotally attached, as at 118, to the pushbutton 102 and extend into the opposed arms 112 of the handle 36. A pin 114 is pivotally attached to each linkage 112, as at 116, and extend out apertures 120 in the ends of the handle arms 112. As shown in FIG. 10, when the pushbutton 102 is pushed downwardly, as at 122, the linkages 110 are pulled downwardly, pulling the pins 114 into the handle arms 112.

The divider 14 is inserted into the basket 12 and the pushbutton 102 is pressed. When the handle arms 112 are aligned with opening 126 in the basket inner wall 20, the pushbutton 102 is released. The spring 106 biases the pushbutton 102 upwardly, causing the pins 114 to extend out of the handle arms 112 and into the openings 126, thereby latching the divider 14 in the basket 12.

Figure 11:
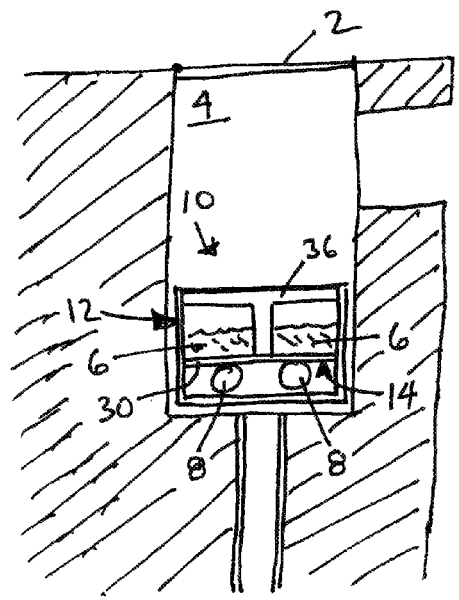
FIG. 11 is a cross-sectional side view of the basket in use.
Figure 12:
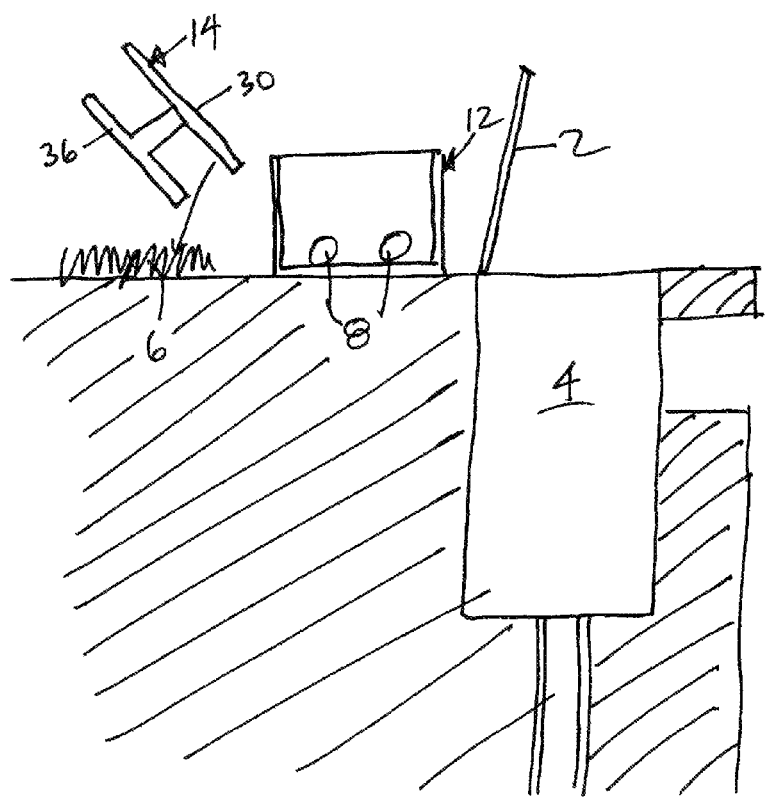
FIG. 12 is a cross-sectional side view of the basket being emptied.

FIGS. 11 and 12 show the skimmer basket and chlorinator 10 of the present invention in use. The chlorine tablets 8 are first dropped into the bottom of the basket 12. The divider 14 is inserted into the basket 12 and the latch 50 is engaged. The basket 12 is placed in the skimmer well 4 as would any other prior art basket and the skimmer cover 2 is closed.

Sometime later, when it is desired to either clean the basket 12 and/or replace the chlorine tablets 8, the user opens the cover 2 and lifts the skimmer basket and chlorinator 10 from the well 4. The user then dumps the debris 6 from the debris compartment and rinses the skimmer basket and chlorinator 10 with a hose if necessary. If the chlorine tablets 8 require replacing, the latch 50 is disengaged, the divider 14 is lifted out of the basket 12 by the handle 36, new chlorine tablets 8 are placed in the basket 12, the divider 14 is reinstalled, and the latch 50 is engaged. Then the skimmer basket and chlorinator 10 is lowered into the well 4.

Thus it has been shown and described a swimming pool skimmer basket and chlorinator which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A swimming pool skimmer basket and chlorinator comprising:
    (a) a basket having a wall and a floor, said wall and said floor having apertures adapted to pass water, said wall having an inner surface;
    (b) a divider within said basket dividing said basket into a tablet compartment adjacent to said floor adapted to receive one or more chlorine tablets and a debris compartment above said divider, said divider being removable from said basket and comprising a disk having apertures adapted to pass water and a handle extending upwardly from said disk;
    (c) a guide wherein said basket inner surface includes at least one vertical rail and said disk includes a corresponding notch; and
    (d) a latch for securing said divider in said basket.

2. The swimming pool skimmer basket of claim 1 wherein said handle has a post extending upwardly from said disk to an upper end and a cross bar at said upper end, said cross bar having opposed ends.

3. The swimming pool skimmer basket of claim 2 wherein said latch includes protrusions at said cross bar ends and depressions at opposed locations in said basket inner surface that receive said protrusions.

4. A swimming pool skimmer basket and chlorinator comprising:
    (a) a basket having a wall and a floor, said wall and said floor having apertures adapted to pass water, said wall having an inner surface;
    (b) a divider within said basket dividing said basket into a tablet compartment adjacent to said floor adapted to receive one or more chlorine tablets and a debris compartment above said divider, said divider being removable from said basket and comprising a disk having apertures adapted to pass water and a handle including a post extending upwardly from said disk to an upper end and a cross bar at said upper end, said cross bar having opposed ends;
    (c) a guide wherein said basket inner surface includes at least one vertical rail and said disk includes a corresponding notch; and
    (d) a latch for securing said divider in said basket, said latch including protrusions at said cross bar ends and depressions at opposed locations in said basket inner surface that receive said protrusions.

\* \* \* \* \*

UNITED STATES PATENT AND TRADEMARK OFFICE
CERTIFICATE OF CORRECTION

PATENT NO. : 8,168,065 B1  
APPLICATION NO. : 12/767124  
DATED : May 1, 2012  
INVENTOR(S) : Michael K. Gavigan and William J. Gladue Page 1 of 1

It is certified that error appears in the above-identified patent and that said Letters Patent is hereby corrected as shown below:

Replace FIG. 2 with the following FIG. 2, wherein reference numeral "48" is replaced with --49-- to correct a duplicate use of reference numeral 48:

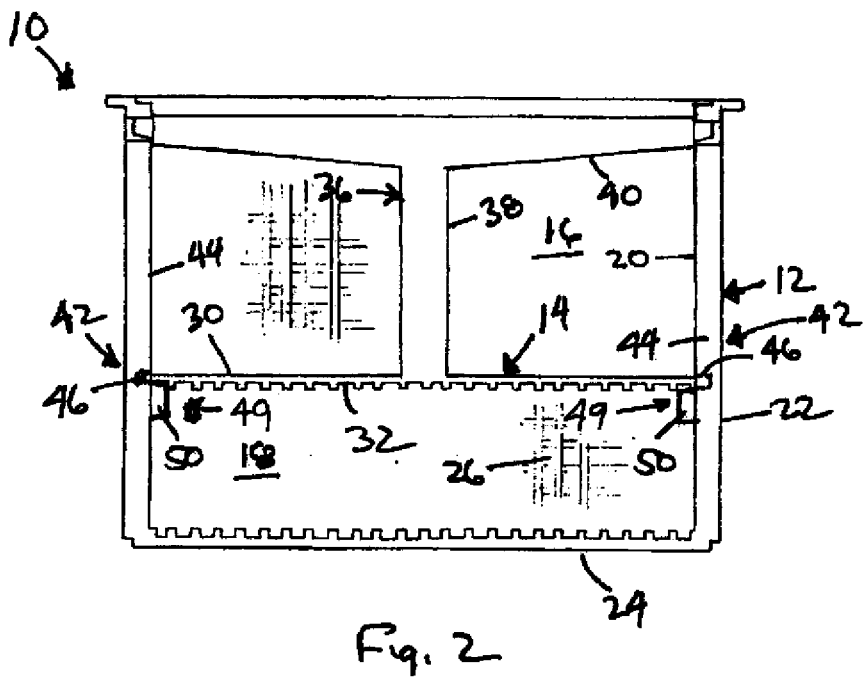

In col. 3, lines 66 and 67, replace "stop 48" with --stop 49-- to correct a duplicate use of reference numeral 48.

In col. 5, lines 29, 38, and 42, replace "latch 50" with --latch 52-- to correct typographical errors.

Signed and Sealed this  
Thirty-first Day of July, 2012

David J. Kappos  
*Director of the United States Patent and Trademark Office*